Patented Dec. 27, 1949

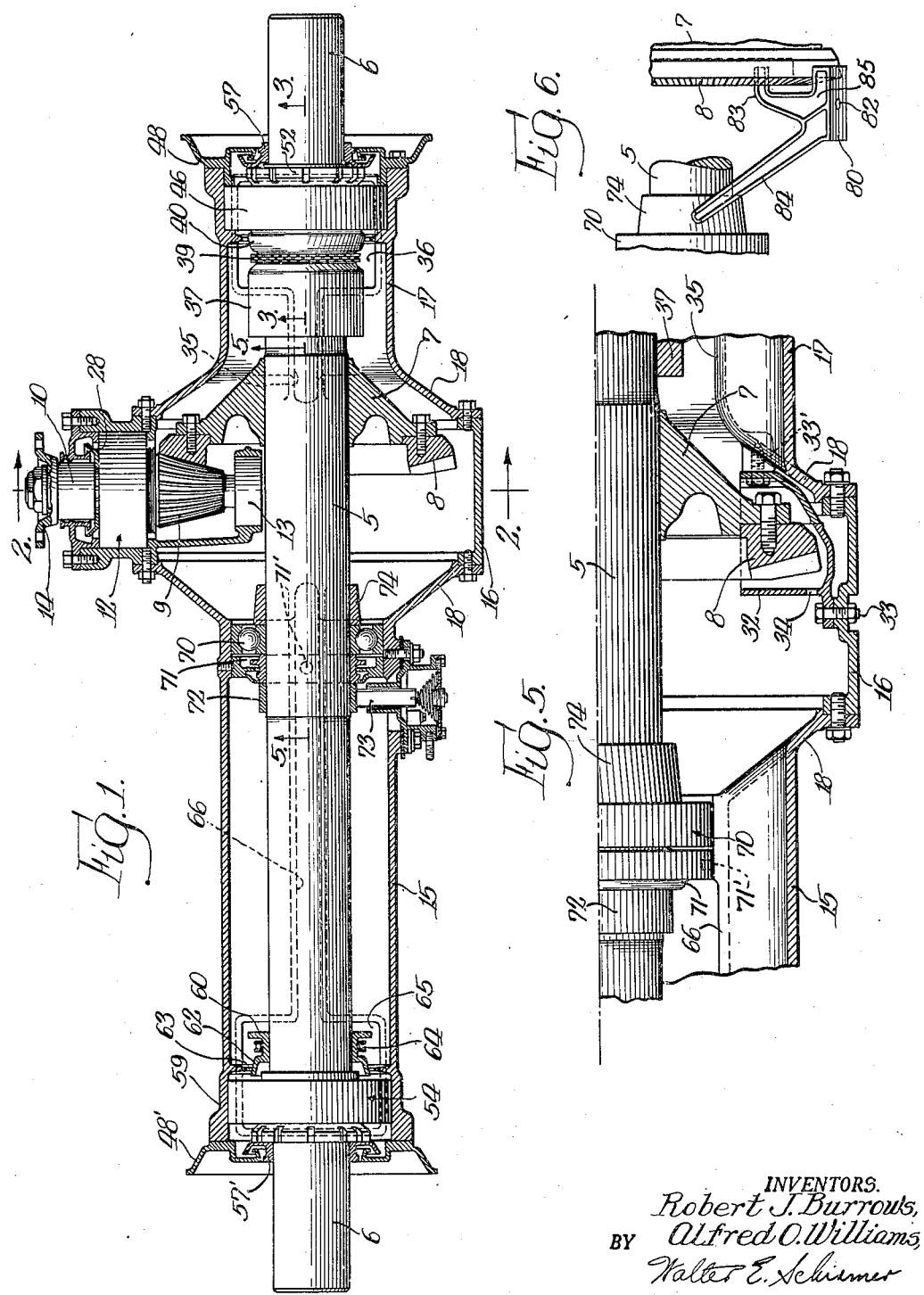

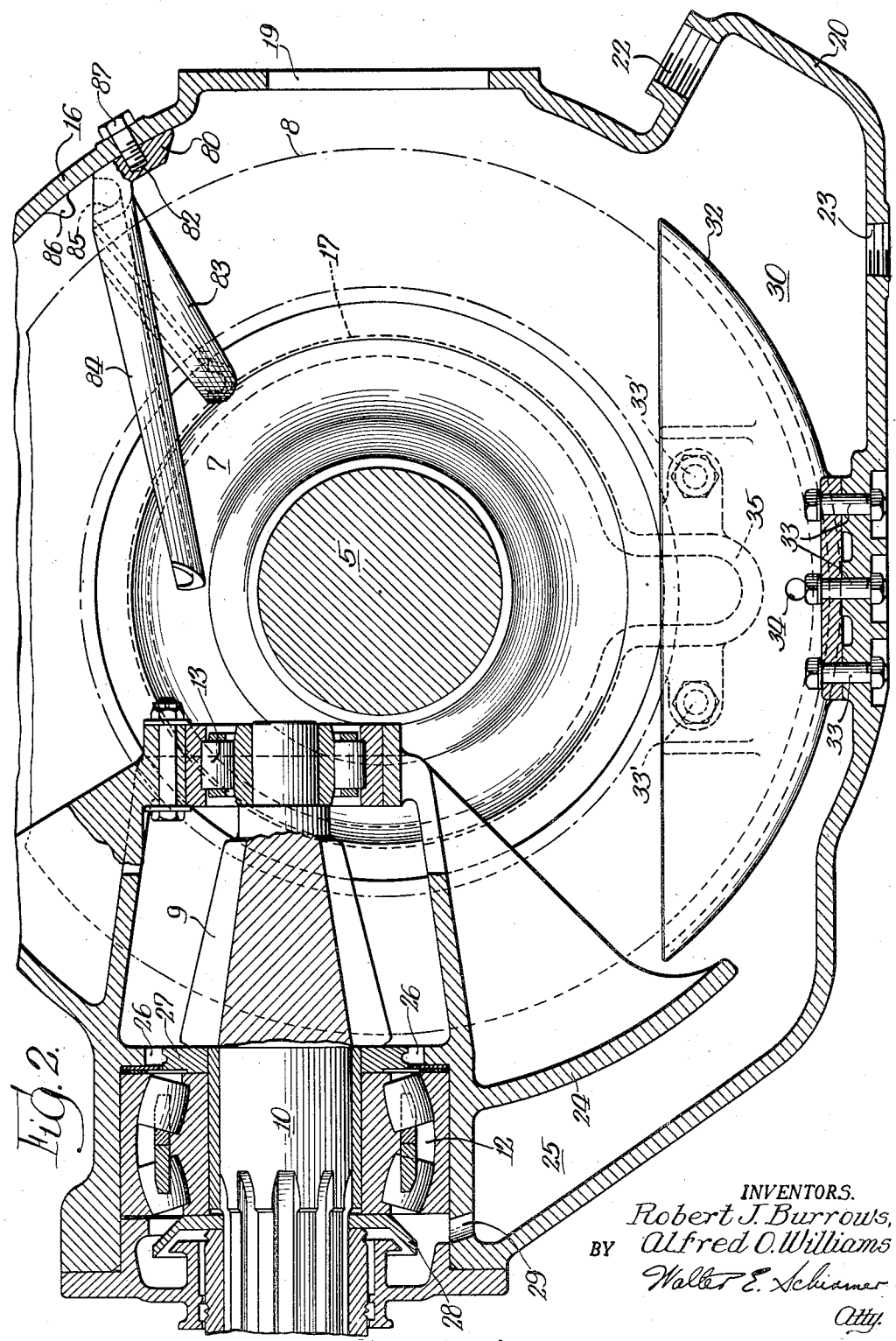

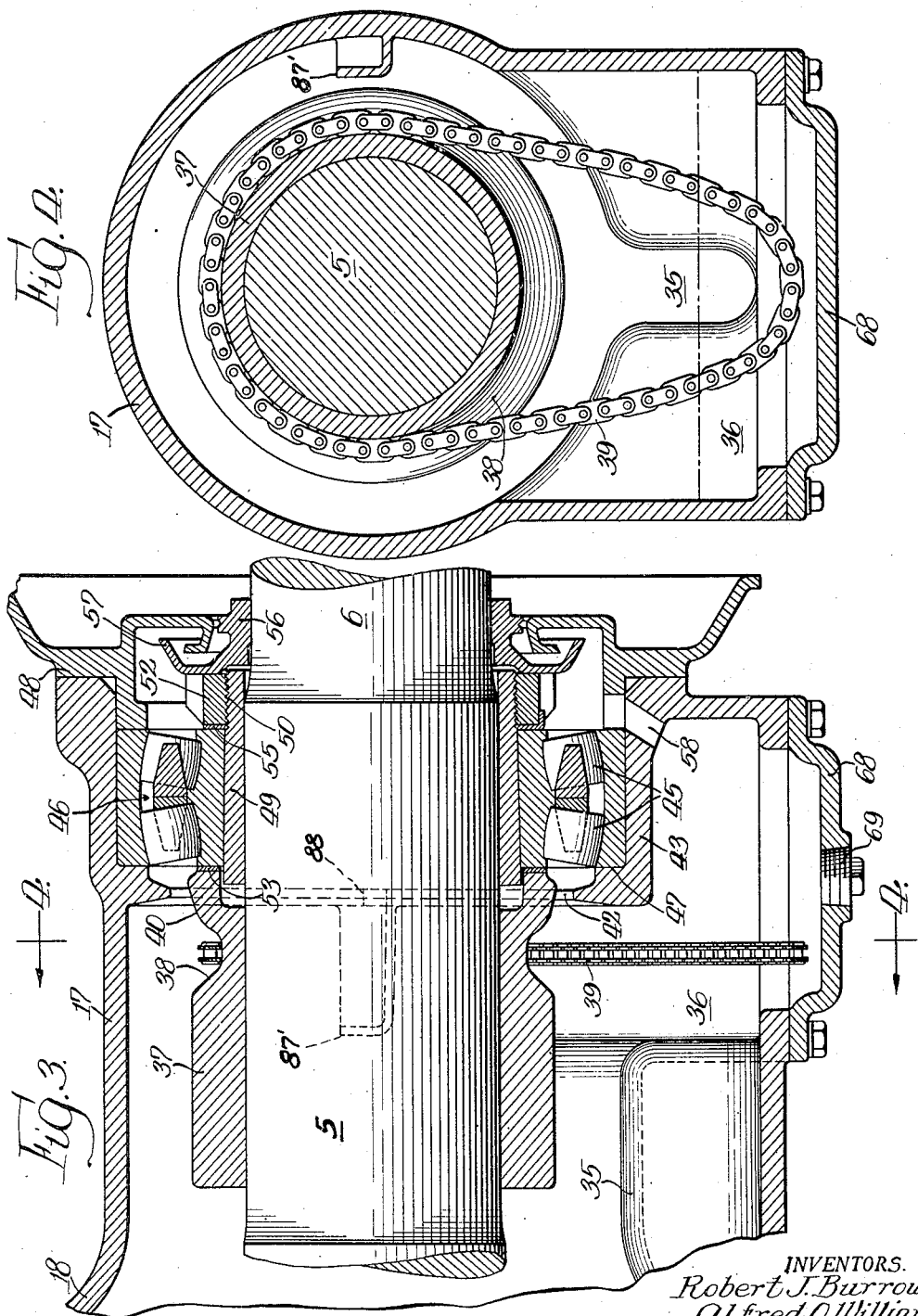

2,492,267

UNITED STATES PATENT OFFICE 2,492,267

AXLE LUBRICATING CONSTRUCTION

Robert J. Burrows and Alfred O. Williams, Battle Creek, Mich., assignors to Clark Equipment Company, Buchanan, Mich., a corporation of Michigan Application May 31, 1945, Serial No. 596,903

14 Claims. (Cl. 184—11)

This invention relates to axle constructions, and more particularly is directed to an axle construction for a rail vehicle such as a rail truck, street car truck or the like.

One of the primary objects of the present invention is to provide a truck axle construction in which the ring gear, which drives the axle, as well as the journal bearings at the ends of the axle are all lubricated from a common reservoir, the pinion bearings being arranged to receive the lubricant by splash from the ring gear. In street car trucks or similar rail vehicles it is customary to provide a driving type axle which includes a ring gear pressed on the axle shaft and driven from a suitable pinion gear connected through a power shaft to a motor or the like. The power shaft extends through suitable bearings into an enlarged gear enclosing portion of the axle housing within which is located the ring gear. The axle shaft upon which the ring gear is mounted is preferably supported at opposite ends by journal bearings.

The present invention contemplates a construction in which the entire assembly for the axle shaft is adjustable through one journal bearing at one end of the axle, the opposite journal bearing not being restrained endwise. There is preferably a radial bearing located adjacent the ring gear to absorb the radial loads imposed thereon and this bearing also is arranged to be lubricated from the same lubricant reservoir.

In the present invention one of the features provided is the metering flow of oil or lubricant to the ring gear. This prevents the ring gear from churning up the main body of lubricant in the reservoir, the metering flow being sufficient only to provide proper lubrication for the ring gear and to transmit this lubricant into the bearings of the pinion shaft adjacent the pinion gear. Preferably the ring gear is arranged to dip at its lower portion into a gear reservoir, which is separated from the main body of lubricant in the enlarged gear portion of the housing and communicates therewith through a metered opening. Thus, after initial rotation of the ring gear the flow of lubricant into contact with the ring gear is so metered as to prevent any churning of the main body of oil and producing excessive heating. By the use of this gear reservoir we also prevent the ring gear from displacing the main body of oil, to the extent that the journal bearings are starved.

In carrying out the present invention we have provided for conjoint lubrication of the journal bearings at opposite ends of the axle shaft by the provision of means formed integral with the axle housing providing for passage of lubricant from the gear housing main reservoir laterally through passageways to the reservoirs beneath the journal bearings of the axle shaft. This passageway or duct system provides for equalizing the level of lubricant throughout the housing assembly, insuring adequate lubrication of all of the bearings and the gearing and yet not transmitting the churned up or emulsified lubricant to the journal bearings, nor starving the journal bearings by the pump action of the ring gear taking all the oil out of the main reservoir.

Still another feature of the present invention resides in the manner in which the lubricant from the reservoirs beneath the journal bearings is transmitted up to such bearings, and in such manner as to provide a sufficient quantity of such oil for lubrication but not to provide over lubrication which might result in excessive leakage.

Another advantage provided by the present construction is the lubrication of the ring gear teeth and the adjacent intermediate radial bearing by lubricant distributing means carried on the wall of the ring gear housing.

Other objects and advantages of the present invention will appear more fully from a careful consideration of the following detailed description which, in conjunction with the accompanying drawings, will afford a complete disclosure to those skilled in the art of the particular construction and operation of one preferred form of our present invention.

In the drawings:

Figure 1 is a transverse sectional view through an axle housing embodying the present invention;

Figure 2 is a vertical sectional view through the enlarged gear portion of the housing taken on line 2—2 of Figure 1;

Figure 3 is an enlarged vertical sectional view on line 3—3 of Figure 1 of the journal bearing section at one end of the axle housing;

Figure 4 is a sectional view taken substantially on line 4—4 of Figure 3;

Figure 5 is a sectional view taken substantially on line 5—5 of Figure 1;

Figure 6 is a detail plan view of the oil distributing trough for the intermediate bearing and ring gear shown in elevation in Figure 2.

Considering now the drawings in detail, the axle shaft which is preferably formed of a high alloy steel is indicated generally at 5 and has the extending ends 6 upon which are pressed the rail wheels (not shown). Pressed onto the shaft 5 intermediate its ends is a ring gear hub indicated generally at 7 having the gear portion 8 secured thereto in the form of a hypoid or spiral bevel gear, being driven by the corresponding pinion gear 9 carried by the pinion shaft 10 which is supported in the bearing assemblies 12 and 13, this providing a straddle mounting for the pinion shaft. The pinion shaft 10 in turn is provided with a universal flange member 14 which is adapted to be coupled to the power shaft leading from the prime mover.

The axle housing for the shaft 5 preferably comprises three sections consisting of an elongated arm section 15, an enlarged gear enclosing section 16, and a relatively short arm section 17. The arm sections 15 and 17 are provided with bell-shaped flanges 18 which are adapted to form therebetween the gear enclosing portion of the housing and are bolted or otherwise secured to the intermediate substantially annular gear enclosing portion 16 of the housing. A suitable inspection opening in the housing portion 16 is provided as shown at 19 in Figure 2, and this housing is also provided with the rearwardly offset portion 20 having an opening 22 therein whereby lubricant can be admitted into this portion of the housing. A drain plug opening 23 is provided at the bottom of this housing section.

Considering Figure 2 in detail, it will be noted that the housing section 16 is provided with a baffle portion 24 which prevents lubricant carried by the ring gear from moving into the chamber 25 formed in this housing section. Lubricant from the ring gear 8 therefore is transmitted to the pinion gear 9 and also, through the annular metered opening 26 passing to the bearing assembly 12 and from this assembly is discharged by the flange plate 28 into the port 29 leading down through the chamber 25 back to the bottom or reservoir portion 30 of the housing section 16. Thus, it will be apparent that the pinion gear and its bearings 12 are lubricated directly from the ring gear 8. Bearing 13 is lubricated by oil thrown off by pinion gear 9.

As will be noted from Figures 2 and 5, there is provided in the bottom portion of the housing section 16 a substantially arcuate gear reservoir member 32 within which the bottom portion of the ring gear 8 dips during rotation thereof. This member 32 is supported by means of bolts 33 on the bottom wall of the housing 16 and also in the side wall or bell-shaped portion 18 of the housing section 17 as by means of the studs 33' whereby this member is rigidly held in position to retain oil therein. The oil is admitted to the gear reservoir 32 through the metered opening 34 formed in the lower portion of the side face thereof, this opening being small enough so that the amount of lubricant admitted to this member, after it has once been cleared of the initial level of lubricant, is sufficiently small in quantity that it will not be churned up or heated by the rotating action of the ring gear.

It will be noted that the housing section 17 adjacent the ring gear 8 and as shown clearly in Figures 1 and 2 is provided with a communicating duct 35 which extends longitudinally of the housing section 17 and opens at its end into the main reservoir 30 formed in the section 16. The duct member 35 therefore provides communication from the main housing section 16 laterally along the bottom section 17 to the reservoir 36 formed beneath the journaled portion of the shaft 5 adjacent its outer end. This reservoir as shown clearly in Figure 3 is substantially of the same depth as the reservoir 30, and the oil level in the reservoir is maintained equal to that in the reservoir 30 through the communicating duct 35.

Mounted on the shaft 5 above the reservoir 36 is a sleeve member 37 which is pressed upon the shaft 5 and which has an annular groove 38 formed therein adapted to receive an upper portion of a continuous chain 39, the lower run of this chain dipping into the reservoir 36. To provide proper lubrication of the journal bearings for both low speed and high speed operations, two systems of lubrication must be provided. For slow speed operation the chain operating in groove 38 will bring up oil from sump 36 which will travel out along cone 40 through opening 42 into the journal bearing 46. At high speeds oil is thrown off both cone 40 and chain 39 onto the inner wall of housing 17. Centrifugal force prevents oil from creeping along cone 40. To catch this oil a trough 87' is provided which conducts it to hole 88 through which it flows into bearing 46. This is true for both journal bearings.

This bearing assembly is of the double roller type and the outer race thereof is seated in the thickened enlarged portion 43 of the housing section 17, and it is held against axial movement against the shoulder portion 47 in one direction and by means of the closure flange member 48 in the other direction. The inner race of the bearing assembly 46 is located relative the sleeve 37 by being mounted upon an annular sleeve 49 engaging over the shaft 5 and having the threaded end 50 provided with a tightening nut 52.

Side position of gear ring 8 with respect to its mating pinion 9 is accomplished by moving shaft 5 axially with relation to axle housing assembly. The correct adjustment is determined by the number and thickness of shim 53. The conventional type of bearing 46 with its tapered sleeve 49 and its threaded collar 52 permits easy removal of the bearing for introduction or removal of shim 53.

It will be noted that gear adjustment and gear thrust is taken only on bearing 46, the outer race of this bearing being restrained between fixed shoulders. The opposite journal bearing carries only radial load and its outer race is free to move axially within its enclosing housing. The inner race of bearing 46, with its tapered sleeve 49, is restrained on shaft 5, between the press fit collar 37 through threaded collar 52 and oil throw collar 56 to wheel hub (not shown) pressed against collar 56. The holding of both the outer race and inner race of this bearing 46 permits gear thrusts and wheel thrusts to be taken in both directions through this bearing. The opposite journal bearing 54 uses the same frictional means through tapered sleeve for clamping this bearing axially with the shaft in order to properly position it on the shaft. It is not subjected to any thrust loads nor does it affect gear adjustment. This is accomplished by the collar 60 being pressed on shaft 5 adjacent the inner race of bearing 54. The collar 60 has a tapered oil throw portion 62, extending toward the inner race of this bearing, whereby oil picked up by chain 64 dipping into oil reservoir 65 will be discharged onto the bearing through the opening 63 in the housing 15.

Excess lubricant which passes through the bearing portion 46 is returned to the reservoir through the return duct 58 where it again is picked up by the chain 39 and returned to the bearing assembly, as shown best in Fig. 3.

Formed in the housing sections 15 and 17 below the bearing assemblies 54 and 46 are the reservoir portions 65 and 36 which have communication through the integrally formed ducts or passageways 66 and 35 with the main reservoir 30 in the housing section 16. Both the reservoirs 65 and 36 are closed at their bottom by means of suitable closure plates 68 as shown in Fig. 3, which closure plates preferably have drain openings closed by the drain plugs 69 for removing the lubricant when desired. The housing ends are closed and the oil retained by members 48 and 57 at one end of the housing and 48' and 57' at the other end of the housing.

In order to accommodate the radial load imposed by the pinion gearing upon the shaft 5 adjacent its center there is provided the bearing assembly 70 immediately adjacent the belled portion 18 of the housing section 15, this bearing assembly being of the radial bearing type and being locked in position in any suitable manner upon the shaft 5.

It will therefore be apparent that with the construction herein disclosed, common lubricating means is provided for the journal bearings at the ends of the axle shaft as well as for the ring gear, pinion gear and pinion bearings. The bearing 70 is also lubricated by means of a trough member 80 shown in Fig. 2, which takes surplus oil from adjacent the top portion of the ring gear and distributes it downwardly onto the sleeve member 74, which member is tapered so that this oil moves up the tapered surface by centrifugal force into the bearing assembly 70. Any oil that passes through bearing 70 is caught by a labyrinth seal 71 and returned through a hole 71' into passageway 66 which returns it to the gear reservoir.

As shown in Figures 2 and 6, there is provided a lubricant distributing member 80, having a tapped portion 82 whereby it may be secured by bolt 87 to the annular internal surface of housing 16. This member is provided with two trough portions 83 and 84, fed from the small reservoir 85 formed in member 80 adjacent the wall of the housing. A suitable lip 86 causes oil running downwardly on the housing wall to drip into the reservoir from whence it runs outwardly through trough 83 to the inner periphery of the ring gear 8 to provide for lubrication of the gear teeth, and through trough 84 to the tapered sleeve 74, where, by centrifugal action, it is directed into the bearing 70 on shaft 5.

It is therefore believed that we have provided a novel method of insuring adequate lubrication of all the bearings of this driving axle assembly, while at the same time preventing any possibility of excessive lubrication or excessive flow of lubricant to the bearings or gears which might cause churning and emulsification, with consequent overheating of the oil, or the possibility of leakage of oil from the housing through the labyrinth oil seals at pinion and journal bearing ends. While it is understood that there are many slight changes in detail and design which might be made in the present construction without in any way departing from the underlying principles of the invention herein disclosed, it is understood that we do not intend to limit the invention to the exact construction herein illustrated, but only as defined by the scope and spirit of the appended claims.

We claim:

1. A drive axle construction for a rail vehicle including an axle shaft, a ring gear mounted intermediate the ends of said shaft, a housing having tubular arm portions encircling said shaft on opposite sides of said gear and having an enlarged gear-enclosing portion providing a lubricant main reservoir below said gear, journal bearings for said shaft in the ends of said housing arm portions, lubricant reservoirs in said housing below said bearings, means for conducting lubricant from said reservoirs to said bearings, and means in said housing paralleling said shaft and spaced therefrom providing common communication between all of said reservoirs.

2. The construction of claim 1 wherein said last-named means comprises longitudinal passageways formed integrally in the lower portions of said housing arm portions between said main reservoir and each of said journal reservoirs.

3. An axle construction for a rail vehicle comprising an axle shaft, a ring gear pressed on said shaft intermediate its ends, a housing having an enlarged annular portion encircling said ring gear and having tubular oppositely extending arm portions about said shaft, journal bearings for said shaft in the ends of said arm portions, said annular housing portion providing a main lubricant reservoir below said ring gear and having a filler extension, lubricant reservoirs formed in said housing and depending below each of said journal bearings, means for conducting lubricant from said reservoirs to said bearings, a gear reservoir in said main reservoir into which said ring gear dips, and means in said housing arm portions providing for communication between said main reservoir and the reservoirs under the journal bearings.

4. The construction of claim 3 including a pinion shaft extending into said housing for driving said ring gear, supporting bearings therefor, and means for returning lubricant supplied to said bearings by said ring gear to said main reservoir.

5. The construction of claim 3 wherein said communication means comprises integral channel-shaped longitudinal passageways formed in the bottom surface of said housing arm portions.

6. The construction of claim 3 further characterized by a radial bearing for said shaft adjacent said ring gear and lubricated therefrom, and means providing for return of lubricant from said radial bearing into said lubricant communication means intermediate said reservoirs.

7. In a rail truck, an axle shaft having a ring gear pressed thereon, an axle housing for said shaft having an enlarged portion about said gear, a gear reservoir mounted in the lower portion of said enlarged portion and receiving the bottom portion of said gear, lubricant in said enlarged portion at a level below the top edge of said gear reservoir, a metering opening near the bottom of said gear reservoir for limiting the amount of lubricant fed thereinto during rotation of said gear, and means in the upper wall of said enlarged portion forming a supplemental reservoir for collecting lubricant running down the upper wall of said portion and discharging it onto said ring gear teeth.

8. An axle construction comprising an axle shaft having a ring gear thereon intermediate the ends thereof, an axle housing for said shaft having an enlarged gear enclosing portion and forming a main lubricant reservoir in the bottom thereof, a projecting filler opening in said portion determining the level of lubricant in said main reservoir, an arcuate gear reservoir supported in said main reservoir and confining the bottom portion of said gear, a metering hole in the side wall of said gear reservoir for admitting lubricant from said main reservoir to said gear reservoir, and means formed integral in said housing below said shaft for conducting lubricant from said main reservoir longitudinally to the ends of said housing.

9. A rail car axle construction comprising an axle shaft having a ring gear thereon intermediate its ends, an axle housing for said shaft having an enlarged annular portion enclosing said gear and longitudinally extending arm portions, a radial bearing for said shaft located in one of said arm portions, and means disposed above the axis of said shaft for collecting lubricant from the inner annular wall of said enlarged portion and discharging it onto the teeth of said ring gear and onto said radial bearing.

10. The construction of claim 9 including a main lubricant reservoir in said annular housing portion beneath said gear, journal bearings for the ends of said shaft, lubricant reservoirs in said arm portions disposed below each journal bearing, and means providing longitudinal communication between said main reservoir and said journal bearing reservoirs.

11. The construction of claim 9 including a main lubricant reservoir in said annular housing portion beneath said gear, journal bearings for the ends of said shaft, lubricant reservoirs in said arm portions disposed below each journal bearing, and means providing longitudinal communication between said main reservoir and said journal bearing reservoirs and including means for receiving lubricant from said radial bearing.

12. In a rail car axle construction, an axle shaft having a ring gear thereon intermediate its ends, journal bearings adjacent the ends of said shaft, an axle housing for said shaft comprising a transverse cylindrical portion enclosing said ring gear and oppositely extending tubular arm sections, each arm section having a depressed longitudinal trough portion in the bottom thereof, said cylindrical portion having a depending main lubricant reservoir into which adjacent ends of said trough portions open, depending rectangular lubricant reservoirs formed in the ends of said arm sections below said bearings and into which the opposite ends of said trough open, whereby all said reservoirs are in common communication.

13. The construction of claim 12 including means providing an offset filler opening in said cylindrical portion of said housing disposed intermediate the top and bottom horizontal planes through said trough portions.

14. The construction of claim 12 including a gear reservoir comprising an arcuate trough member closely surrounding the lower portion of said gear and having a lateral port opening in the side wall thereof communicating with said main reservoir at a point below the bottom plane of said trough portions.

ROBERT J. BURROWS.
ALFRED O. WILLIAMS.

REFERENCES CITED

The following references are of record in the file of this patent:

UNITED STATES PATENTS

| Number | Name | Date |
|---|---|---|
| 801,730 | Lofton | Oct. 10, 1905 |
| 1,331,662 | Neuteboom | Feb. 24, 1920 |
| 1,334,535 | Hawes | Mar. 23, 1920 |
| 1,351,485 | Moon | Aug. 31, 1920 |
| 1,808,792 | Schellens | June 9, 1931 |

FOREIGN PATENTS

| Number | Country | Date |
|---|---|---|
| 290,225 | Great Britain | Sept. 13, 1928 |